Figure 1:
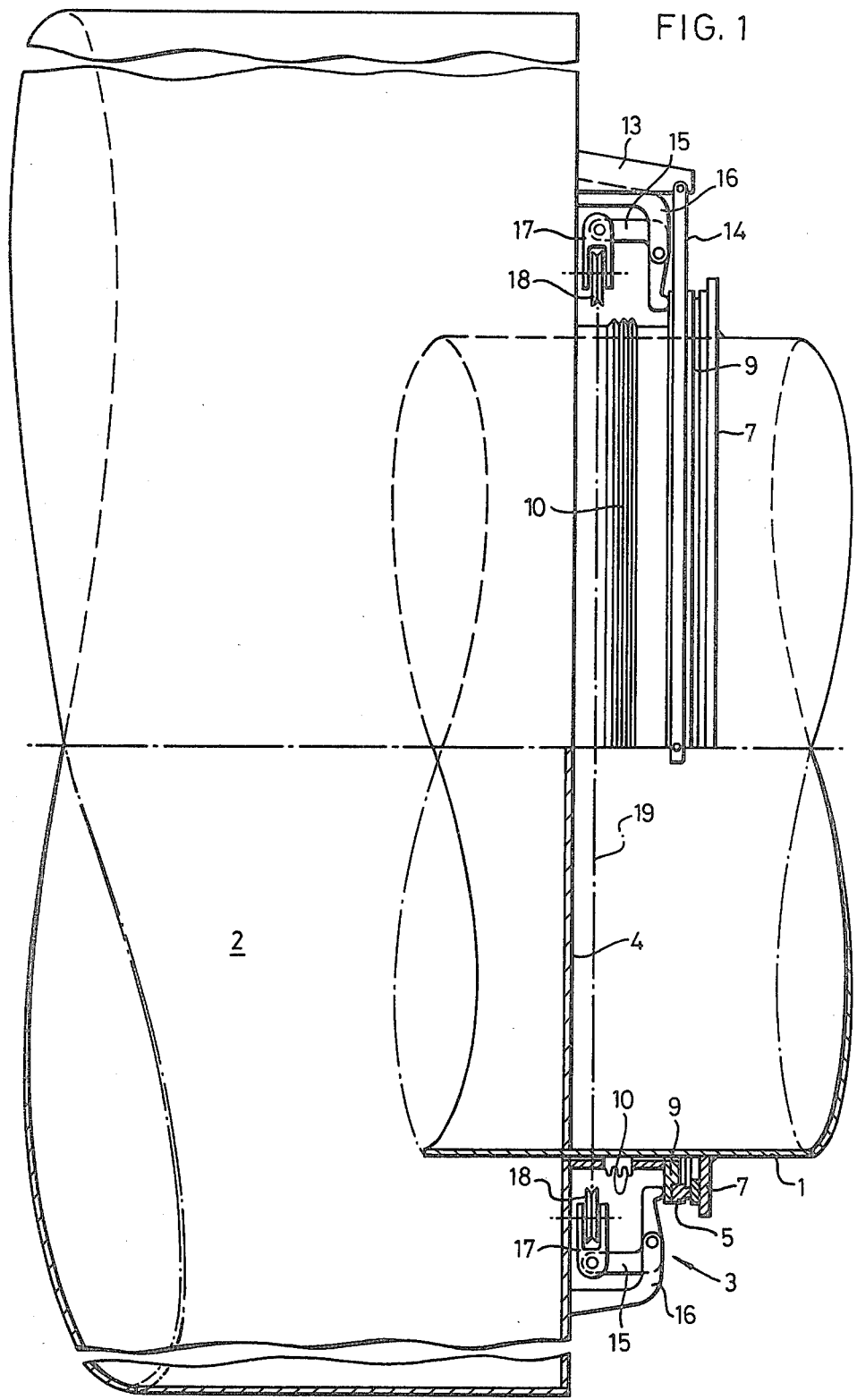

United States Patent [19]

Day et al.

[11] 4,199,155
[45] Apr. 22, 1980

[54] SEALING MEANS FOR ROTARY VESSELS

[75] Inventors: Allon C. Day, Low Worsall; John G. Hogan, Middlesbrough, both of England

[73] Assignee: Head Wrightson & Company Limited, Yarm, England

[21] Appl. No.: 860,558

[22] Filed: Dec. 14, 1977

[51] Int. Cl.² ............................................. F16J 15/36
[52] U.S. Cl. ...................................... 277/88; 277/199
[58] Field of Search ................................... 277/81–96, 277/193, 199

[56] References Cited
U.S. PATENT DOCUMENTS

| 1,967,573 | 7/1934 | Fox | 277/199 |
| 2,888,280 | 5/1959 | Meyer et al. | 277/88 |

Primary Examiner—Robert I. Smith
Attorney, Agent, or Firm—Diller, Ramik & Wight

[57] ABSTRACT

In or for a large diameter rotary vessel having an end which projects into or through a stationary hood, a sealing arrangement comprising a wear ring surrounding the vessel, a sealing ring operatively associated with the wear ring, the sealing ring being mounted on a backup ring surrounding the vessel and depending from the stationary hood, and means for applying constant pressure between the interfaces of the sealing ring and the wear ring.

12 Claims, 3 Drawing Figures

SEALING MEANS FOR ROTARY VESSELS

This invention relates to a sealing arrangement for large diameter rotary vessels, such as rotary dryers. By "large diameter vessels" is meant vessels which are about four feet or more in diameter.

A sealing arrangement for use on a large diameter rotary vessel generally has to be such as to accommodate the unavoidable problems of eccentricity, and of limited axial movement due to longitudinal expansion of the vessel. The latter aspect necessitates an arrangement in which the seal interface pressure is maintained constant by automatic means so as to ensure minimum wear, and also frictional resistance commensurate with an acceptable degree of sealing.

Dependent upon the use to which the vessel is to be put, the arrangement may also have to be such that it lends itself to easy inspection, and also to rapid and simple dismantling and replacement of worn components, possibly by personnel encumbered by protective clothing whilst working in confined conditions.

Furthermore, modern technology, particularly in the chemical field, has created additional problems concerning seal material/product compatibility which necessitates changes in seal design to compensate for the inherent mechanical properties of the seal materials, the choice of which materials being dictated by the process product.

It is among the objects of the present invention to provide a sealing arrangement for large rotary vessels which meets, or at least substantially meets, the aforementioned requirements.

According to the present invention, there is provided in or for a large diameter rotary vessel an end of which projects into or through a stationary hood, a sealing arrangement comprising a sealing ring, a back-up ring supported about the rotary vessel and formed to house and support the sealing ring, a wear ring supported on the rotary vessel for sliding engagement by the sealing ring, and means for applying constant pressure between the interfaces of the sealing ring and the wear ring.

Preferably, the sealing ring is made up of segments, these being held in position relative to one another by means of a single girth cord or spring, or by other suitable means.

According to a further aspect of the present invention, the loading mechanism means which control the seal interface pressure may comprise a plurality of circumferentially spaced brackets fixedly supported in the region of the back-up ring, a bellcrank lever supported on each bracket one arm of each lever being in engagement with the back-up ring and the other arm of each lever supporting a pulley, and an endless wire or the like extending over the series of pulleys and attached to a dead weight or other constant force means, such as hydraulically operated pressure applying means, whereby in use the weight or other means applies a constant force to the back-up ring via the bellcrank levers.

According to the invention furthermore, the sealing arrangement may include a static seal operatively associated with the back-up ring. Such a static seal may be in the form of a flexible membrane, for example a diaphragm, a bellows device or other means of corrugated cross-section, and may be of a textile fabric, rubber, metal such as stainless steel, or any other suitable material which is compatible with the process product.

Figure 2:
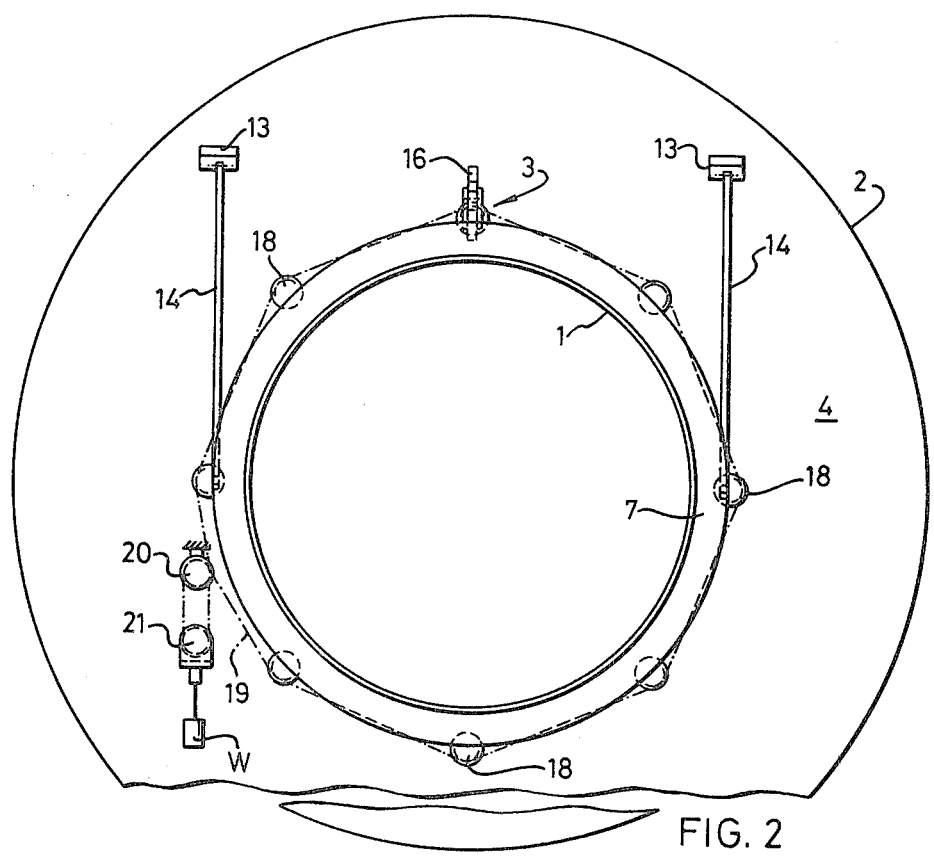
Figure 3:
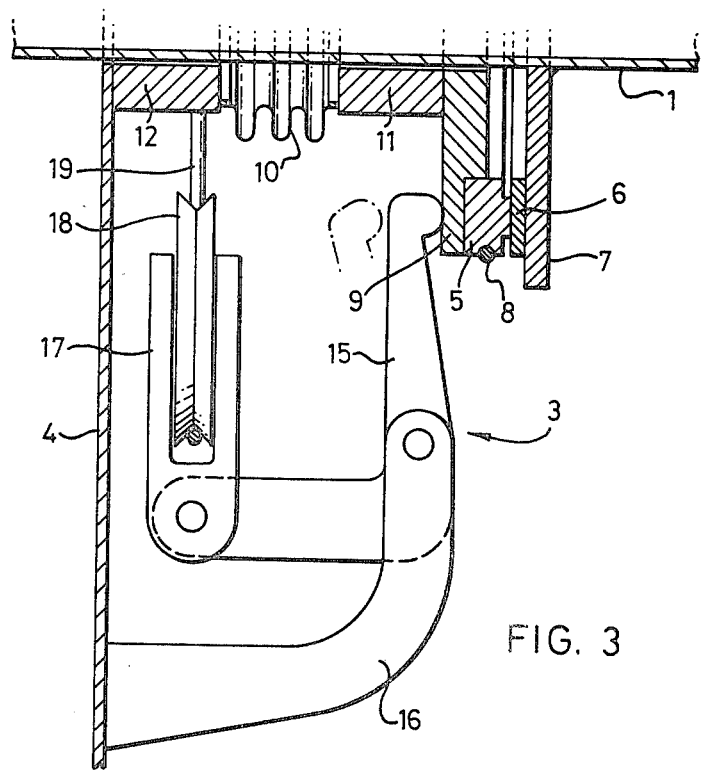

The invention is illustrated by way of example in the accompanying drawings in which, FIG. 1 is a half section, half elevation of a rotary vessel in the form of a rotary dryer incorporating the sealing arrangement according to the invention, FIG. 2 is a corresponding end elevation, FIG. 3 shows part of FIG. 1 on an enlarged scale.

Referring to the drawings, there is shown a rotary dryer comprising a rotatable drum 1 which extends into or through a stationary hood 2, a sealing arrangement generally indicated at 3 being provided between the outer periphery of the drum 1 and an end wall 4 of the hood 2.

The sealing arrangement 3, which is in the form of a dynamic seal, comprises a segmental sealing ring 5 which is positioned to enter into sealing arrangement with a wear ring 6 attached to an annular flange 7 secured to the drum 1. The segments of the sealing ring 5 are held in position by a girth cord or spring 8 and the structure so formed is housed in, and supported by, a back-up ring 9.

Further sealing is provided by a static seal in the form of a corrugated flexible membrane 10 of, for example metal such as spring steel, which extends between an annular element 11 secured to the back-up ring 9 and an annular element 12 secured to the hood 2. In this respect, it will be appreciated that the static seal permits limited axial movement to take place between the drum and the hood. The back-up ring 9 is supported from brackets 13 fixed to the hood 2 via pivotally mounted suspension links 14. This provides the advantages that it prevents rotation of the sealing ring; it maintains the sealing ring 5 concentric with the other components; and it permits the sealing ring 5 to accommodate out-of-plane misalignment of the wear ring 6.

In order to control the seal interface pressure, the sealing arrangement further includes a plurality of circumferentially spaced bellcrank levers 15 which are each hingedly supported on brackets 16 fixed to the hood 2. One arm of each lever 15 is in engagement with the back-up ring 9 and the other arm thereof supports, via a yoke 17, a pulley 18. A single endless tensioning wire 19 is positioned over the pulleys 18 and, in order to create tension, the wire 19 is coupled to and passed round a pair of fixed pulleys 20 and a floating pulley 21 to which is attached a dead weight W. Thus, it will be seen that the weight W maintains constant tension on the wire 19 and thus constant pressure on the back-up ring 9 via the series of bellcrank levers 15. The magnitude of the weight and the number of bellcrank levers etc. will be varied to suit particular circumstances.

It will be appreciated that the sealing arrangement in general, has been designed for quick-release under hazardous conditions by personnel wearing cumbersome protective clothing whilst working in situations with limited access. To this end, the tension wire and the dead weight have been utilized to enable the sealing ring and the loading mechanism to be released from at a single working station to effect disengagement of the sealing ring and the wear ring. Automatic and positive self-retraction of the back-up ring assembly (even under vessel expanded conditions) is ensured by having the initial extension of the flexible membrane 10 greater than the expansion of the drum 1, i.e., upon taking the load off the tension wire 19 the sealing ring 5 will automatically be retracted from the wear ring 6. The two major advantages arising from this feature are, (a) the sealing ring and wear ring can be inspected without dismantling the system fully and (b) should it be necessary to remove the sealing ring segments this can be done easily after release of the girth cord or spring.

Furthermore, the open design of the seal loading mechanism enables the system to be inspected for worn or siezed components and, if necessary, hosed clean. Replacement of worn pins, bushes, etc., is simple and a second groove may be provided in the pulleys 18 for the fitting of a new tension wire prior to absolute failure of the one in use.

In addition, the arrangement of the present invention has the advantage that, since the face seal is normal to the longitudinal axis of the vessel or drum, any eccentric movement between the sealing faces is accommodated without difficulty. Also, link suspension of the back-up ring permits axial movement of the vessel or drum under virtually no load.

We claim:

1. A sealing arrangement comprising in combination a large diameter hollow rotary member having an end projecting into an apertured stationary member, said sealing arrangement including a sealing ring encircling said hollow member end, a back-up ring supporting said sealing ring, means for supporting said back-up ring from said stationary member for axial movement of said back-up ring relative to said rotary member end, a wear ring surrounding said rotary member end and being carried thereby, means for applying constant pressure to said back-up ring to urge the latter axially such that contacting interfaces of said wear ring and sealing ring are at all times held in sealing contact during relative rotation of said members, and said back-up ring is supported by means of pivotally mounted supported links attached to brackets secured to said stationary member.

2. A sealing arrangement comprising in combination a large diameter hollow rotary member having an end projecting into an apertured stationary member, said sealing arrangement including a sealing ring encircling said hollow member end, a back-up ring supporting said sealing ring, means for supporting said back-up ring from said stationary member for axial movement of said back-up ring relative to said rotary member end, a wear ring surrounding said rotary member end and being carried thereby, means for applying constant pressure to said back-up ring to urge the latter axially such that contacting interfaces of said wear ring and sealing ring are at all times held in sealing contact during relative rotation of said members, and the means for applying constant pressure between said interfaces of said back-up ring and said wear ring comprise a plurality of circumferentially spaced bellcrank levers, each of said levers being supported on a bracket secured to said stationary member, a pulley mounted on one arm of each of said bellcrank levers, an endless tension wire positioned over said pulleys, and means for applying constant tension to the ends of said tension wire to urge the other arm of each of said bellcrank levers into pressure contact with said back-up ring.

3. A sealing arrangement as claimed in claim 2, wherein said means for applying constant tension to said ends of said tension wire comprise a dead weight.

4. A sealing arrangement as claimed in claim 2, wherein each said pulley is formed with a pair of circumferential wire receiving grooves.

5. A sealing arrangement comprising in combination a large diameter hollow rotary member having an end projecting into an apertured stationary member, said sealing arrangement including a sealing ring encircling said hollow member end, a back-up ring supporting said sealing ring, pivot and linkage means for supporting said back-up ring from said stationary member for axial movement of said back-up ring relative to said rotary member end, a wear ring surrounding said rotary member end and being carried thereby, and means for applying constant pressure to said back-up ring to urge the latter axially such that contacting interfaces of said wear ring and sealing ring are at all times held in sealing contact during relative rotation of said members.

6. The sealing arrangement as defined in claim 5 including annular static sealing means surrounding said rotary member end for effecting a seal between said back-up ring and said stationary member.

7. The sealing arrangement as defined in claim 5 including annular static sealing means surrounding said rotary member end for effecting a seal between said back-up ring and said stationary member, and said static sealing means being a flexible sleeve disposed between a first annular element secured to said back-up ring and a second annular element secured to said stationary member.

8. A sealing arrangement as claimed in claim 7 wherein said pivot and linkage means include pivotally mounted supported links attached to brackets secured to said stationary member.

9. The sealing arrangement as defined in claim 5 wherein said sealing ring is made up of a plurality of co-acting segments, and said segments are held in position relative to each other by an annular securing band.

10. A sealing arrangement as claimed in claim 9 wherein said pivot and linkage means include pivotally mounted supported links attached to brackets secured to said stationary member.

11. The sealing arrangement as defined in claim 6 wherein said sealing ring is made up of a plurality of co-acting segments, and said segments are held in position relative to each other by an annular securing band.

12. The sealing arrangement as defined in claim 7 wherein said sealing ring is made up of a plurality of co-acting segments, and said segments are held in position relative to each other by an annular securing band.

* * * * *

UNITED STATES PATENT AND TRADEMARK OFFICE
CERTIFICATE OF CORRECTION

PATENT NO. : 4,199,155
DATED : April 22, 1980
INVENTOR(S) : Allon C. Day & John G. Hogan It is certified that error appears in the above–identified patent and that said Letters Patent are hereby corrected as shown below:

--[30]  Foreign Application Priority Data

December 21, 1976 [GB]  United Kingdom.....53265/76--

*Signed and Sealed this*

*Twenty-fourth* Day of *June 1980*

[SEAL]

Attest:

SIDNEY A. DIAMOND

Attesting Officer      *Commissioner of Patents and Trademarks*